(12) United States Patent
Oka et al.

(10) Patent No.: US 7,758,680 B2
(45) Date of Patent: Jul. 20, 2010

(54) TRACTOR

(75) Inventors: Yozo Oka, Osaka (JP); Noboru Yamamoto, Osaka (JP); Nobuaki Takahashi, Osaka (JP)

(73) Assignee: Yanmar Co., Ltd., Osaka (JP)

( * ) Notice: Subject to any disclaimer, the term of this patent is extended or adjusted under 35 U.S.C. 154(b) by 393 days.

(21) Appl. No.: 11/885,678

(22) PCT Filed: Jan. 4, 2006

(86) PCT No.: PCT/JP2006/300012

§ 371 (c)(1),
(2), (4) Date: Sep. 4, 2007

(87) PCT Pub. No.: WO2006/092907

PCT Pub. Date: Sep. 8, 2006

(65) Prior Publication Data

US 2008/0168904 A1    Jul. 17, 2008

(30) Foreign Application Priority Data

Mar. 2, 2005  (JP)  ............... 2005-058199
Aug. 29, 2005  (JP)  ............... 2005-248394

(51) Int. Cl.
*B01D 46/00* (2006.01)
(52) U.S. Cl. ............... 96/416; 55/385.3; 55/482; 123/198 E; 180/68.1; 180/84
(58) Field of Classification Search ............... 55/385.3, 55/385.1, 487, 505, 507, 482; 123/198 E, 123/41.49; 180/84, 68.1; 96/414, 415, 416
See application file for complete search history.

(56) References Cited

U.S. PATENT DOCUMENTS 2,480,379 A * 8/1949 Newberry ............... 55/447
4,509,613 A * 4/1985 Yamaguchi ............... 180/219
5,067,253 A * 11/1991 Hauch et al. ............... 34/82
6,068,675 A * 5/2000 Tsuda et al. ............... 55/385.3

FOREIGN PATENT DOCUMENTS

| JP | 57-94528 | 6/1982 |
|----|----------|--------|
| JP | 57-103051 | 6/1982 |
| JP | 60-53611 | 3/1985 |
| JP | 3-132429 | 6/1991 |
| JP | 7-38649 | 4/1995 |
| JP | 2963445 | 8/1999 |
| JP | 2001-329920 | 11/2001 |
| JP | 2004-299635 | 10/2004 |

* cited by examiner

*Primary Examiner*—Duane Smith
*Assistant Examiner*—Minh-Chau T Pham
(74) *Attorney, Agent, or Firm*—Jordan and Hamburg LLP (57) ABSTRACT

The present invention provides a tractor in which necessity of maintenance of a precleaner can be checked without opening a bonnet every time. In a tractor in which the outside air which is purified through a precleaner is further purified through an air cleaner before the outside air is supplied to an engine, a radiator is arranged in front of the engine, the precleaner is arranged in front of the radiator, and the engine, the radiator and the precleaner are covered with a bonnet, the precleaner is arranged such that the interior of at least a dust collecting/storing portion of the precleaner is viewable from the outside in a see-through manner, and the bonnet includes a viewing portion through which the interior of the dust collecting/storing section is viewable.

6 Claims, 7 Drawing Sheets

TRACTOR

TECHNICAL FIELD

The present invention relates to a tractor which makes a pre-cleaner arranged in the inside of a bonnet viewable from the outside.

BACKGROUND ART

Conventionally, as one mode of a tractor, there has been known a tractor which supplies outside air purified through a pre-cleaner to an engine after further purifying the outside air through an air cleaner (for example, see patent literature 1).

Further, while the engine and the air cleaner are covered with the openable bonnet, the pre-cleaner is arranged outside and above the bonnet. Accordingly, it is possible to view a dust-collection/storage state of the pre-cleaner easily.

However, when the bonnet is opened, the pre-cleaner which is arranged above the bonnet becomes an obstacle and hence, it is necessary to preliminarily remove the pre-cleaner or a portion of an intake pipe connected to the pre-cleaner thus giving rise to a drawback that such a removal operation takes time and efforts.

Further, in a desert area or an area with a large amount of yellow sands, it is necessary to frequently perform maintenance of the pre-cleaner thus giving rise to a drawback that such maintenance requires considerable amounts of times efforts.

To overcome the above-mentioned drawbacks, a tractor which arranges a pre-cleaner in the inside of a bonnet is developed (for example, see patent document 2).

Here, while a pre-cleaner is arranged in front of a radiator, an air cleaner is arranged behind the radiator.

However, the above-mentioned latter tractor still has following drawbacks.

(1) The pre-cleaner is arranged in the inside of the bonnet and hence, to view a dust-collection/storage state of the pre-cleaner, it is necessary to open the bonnet every time for viewing the dust-collection/storage state of the pre-cleaner thus giving rise to a drawback that such an operation requires times and efforts.

(2) The air cleaner is arranged behind the radiator and hence, there exists a drawback that a communication pipe which connects the pre-cleaner arranged in front of the radiator and the air cleaner is elongated and, at the same time, the pre-cleaner and an air tank cannot be arranged in a compact manner.

(3) The air cleaner is arranged behind the radiator and hence, the air cleaner is heated by heat radiated from the radiator thus elevating a temperature of the outside air which is purified through the air cleaner. As a result, high-temperature air is supplied to an engine thus giving rise to a drawback that an output of the engine is lowered.

Patent document 1: JP-A-2004-299635

Patent document 2: JP-UM-B-7-38649

DISCLOSURE OF THE INVENTION (1) According to a first aspect of the present invention, there is provided a tractor in which outside air that is purified through a precleaner is further purified through an air cleaner before the outside air is supplied to an engine, wherein a radiator is arranged in front of the engine, the precleaner is arranged in front of the radiator, and the engine, the radiator and the precleaner are covered with a bonnet, the precleaner is arranged such that the interior of at least a dust collecting/storing portion of the precleaner is viewable from the outside in a see-through manner, and the bonnet includes a viewing portion through which the interior of the dust collecting/storing section is viewable.

Due to such a constitution, at least the inside of the dust-collection/storage portion of the pre-cleaner is viewable through the viewing portion provided to the bonnet and hence, time and efforts for opening the bonnet each time becomes no more unnecessary, and by merely viewing the inside of the dust-collection/storage portion through the viewing portion, a dust-collection/storage state in the inside of the dust-collection/storage portion can be surely viewed thus easily confirming the necessity of the maintenance of the pre-cleaner.

(2) According to a second aspect of the present invention, the viewing portion is arranged at a position of the bonnet which is viewable from the direction substantially horizontal with respect to the dust collecting/storing portion through the viewing portion Due to such a constitution, the dust-collection/storage state in the inside of the dust-collection/storage portion can be surely confirmed through the viewing portion with a relax posture. As a result, it is possible to effectively and accuracy perform a maintenance operation of the pre-cleaner.

(3) According to a third aspect of the present invention, the precleaner is arranged at a position in front of the radiator, and is arranged at a position above a radiator core portion which forms a heat generating portion of the radiator.

Due to such a constitution, the pre-cleaner which is arranged in front of the radiator is arranged at the position above the radiator core portion and hence, it is possible to prevent the precleaner body from becoming an obstacle against a cooling wind which flows from a front side of the precleaner body toward the radiator core portion behind the precleaner body thus ensuring the smooth heat radiation of the radiator. As a result, it is possible to ensure a favorable cooling function of the engine by the radiator.

Further, the precleaner body is arranged at the upper position and hence, an operator can perform the viewing operation of the dust collecting/storing portion through the viewing portion formed in the bonnet in a relaxed posture. As a result, the operator can surely perform the viewing operation and hence, the operator can efficiently and properly perform the maintenance operation of the precleaner body and, at the same time, a fatigue which the operator feels in the viewing operation can be reduced.

(4) According to a fourth aspect of the present invention, the precleaner, the air cleaner and a battery are arranged from above to below in order at a position in front of the radiator, and the precleaner, the air cleaner and a battery are arranged such that at least portions thereof overlap each other.

Due to such a constitution, the precleaner, the air cleaner and the battery can be arranged in a compact manner at the position in front of the radiator. As a result, it is possible to shorten a longitudinal width of the body of the tractor.

(5) According to a fifth aspect of the present invention, a lighting window portion is formed in the bonnet.

In this manner, by forming the lighting window portion in the bonnet, it is possible to bring right into the inside of the bonnet through the lighting window portion and hence, the visibility of the storing state of the dust or the like in the inside of the dust collecting/storing portion through the viewing window can be enhanced.

As a result, the operator can surely view the storing state of the dust or the like in the inside of the dust collecting/storing portion through the viewing window in a relaxed posture and hence, the maintenance operation of the precleaner can be performed efficiently and properly.

(6) According to a sixth aspect of the present invention, the viewing portion and the lighting window are formed in the bonnet which is positioned in the vicinity of the dust collecting/storing portion of the precleaner.

In this manner, the viewing portion and the lighting window portions are formed in the portions of the bonnet positioned in the vicinity of the dust collecting/storing portion of the precleaner and hence, the surrounding of the dust collecting/storing portion can be surely brightened with a light brought into the bonnet through the lighting windows of the respective lighting window portions and, at the same time, the operator can surely and easily view the brightly illuminated dust collecting/storing portion through the viewing window of the viewing portion formed in the vicinity of the dust collecting/storing portion.

BEST MODE FOR CARRYING OUT THE INVENTION

Figure 1:
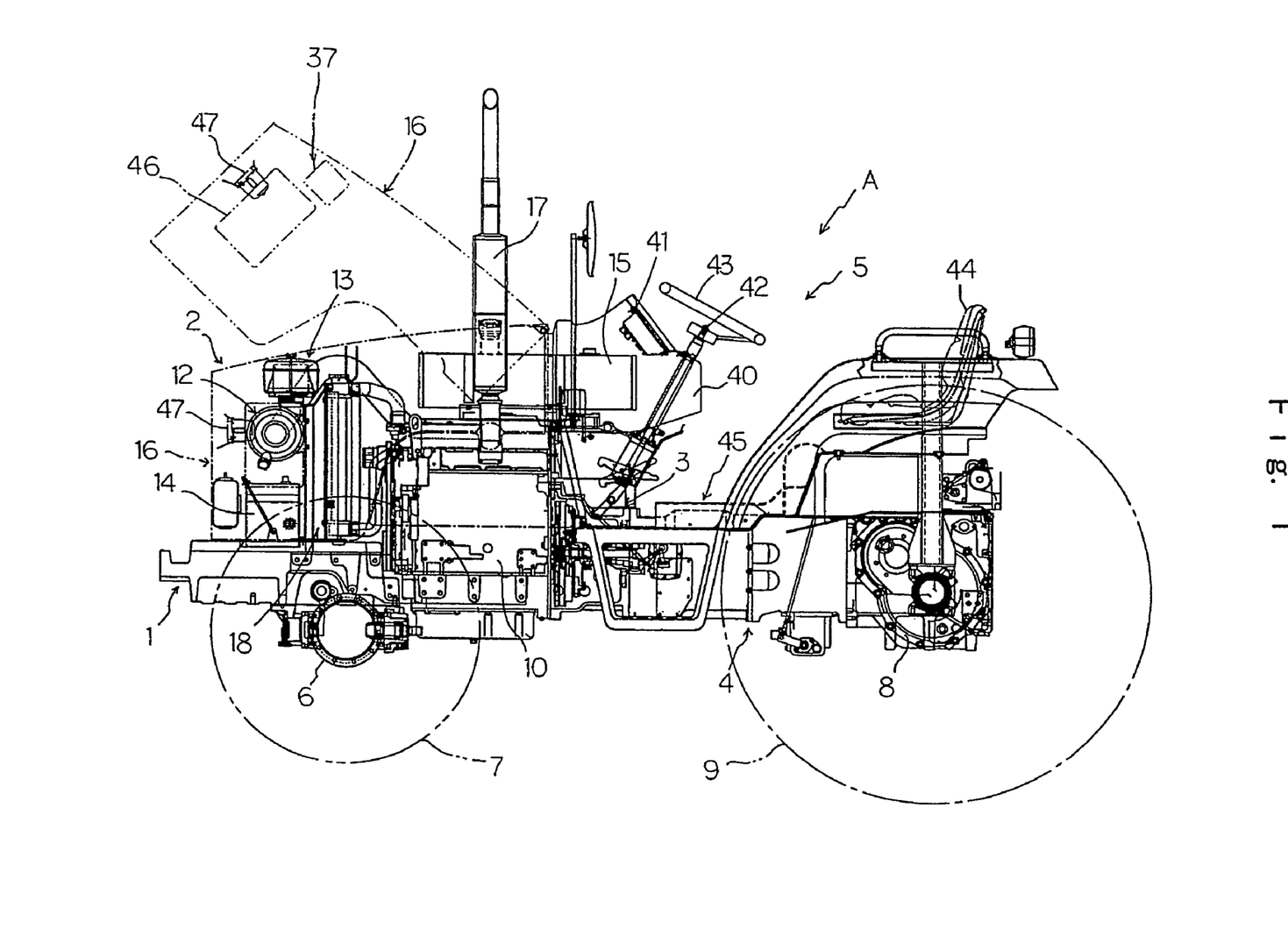
FIG. 1 is an explanatory view showing a side surface of a tractor according to the present invention.
Figure 2:
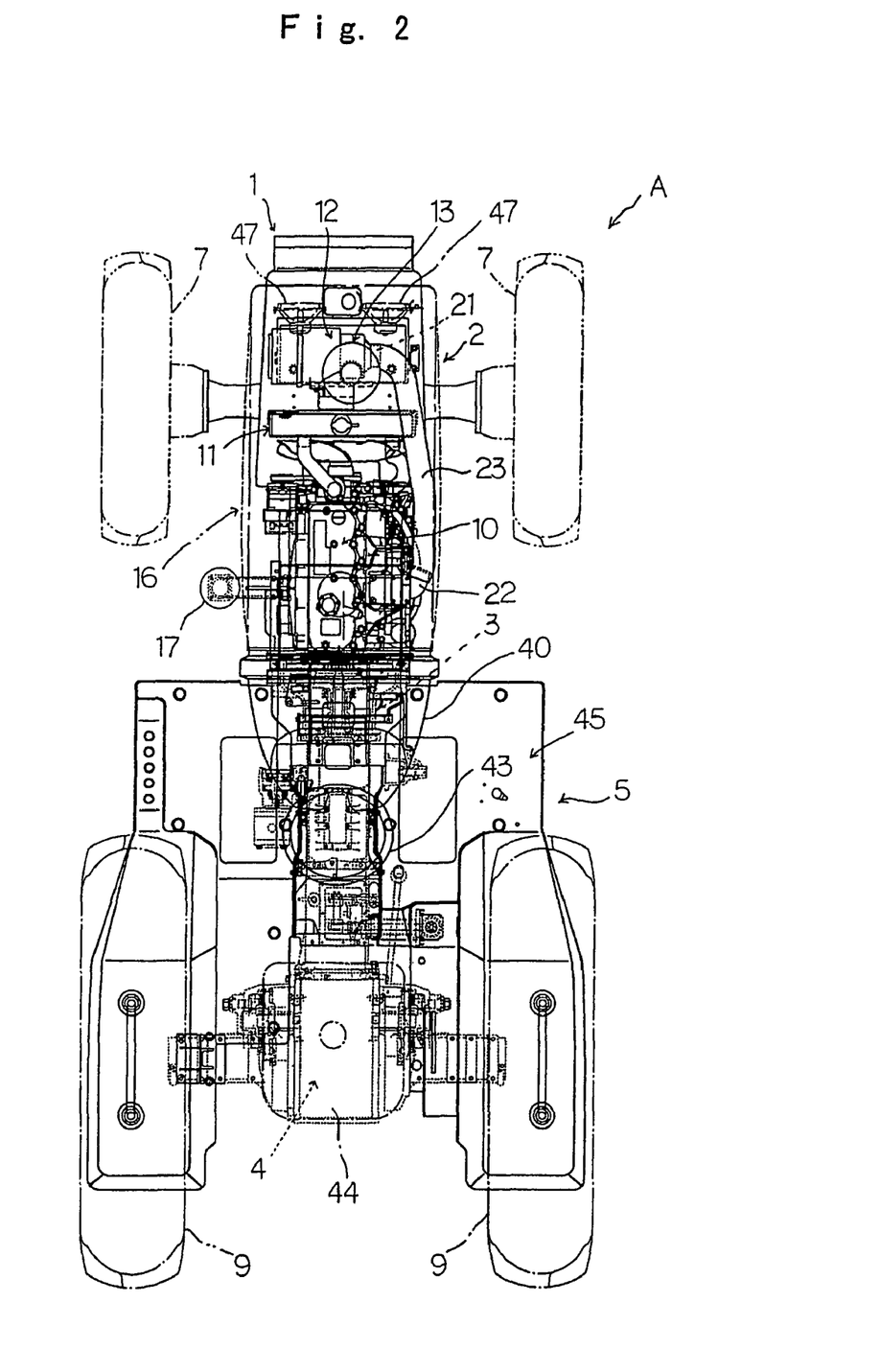
FIG. 2 is a plan view of the tractor.

Symbol A shown in FIG. 1 and FIG. 2 indicates a tractor according to the present invention. In the tractor A, a prime mover portion 2 is mounted on a body frame 1, a transmission portion 4 is interlockingly connected to the prime mover portion 2 by way of a clutch portion 3, a driver portion 5 is arranged on the transmission portion 4, a pair of left and right front wheels 7, 7 are interlockingly connected to a lower portion of the body frame 1 by way of a front axle case 6, and a pair of left and right rear wheels 9, 9 are interlockingly connected to the transmission portion 4 by way of a rear axle cases 8, 8.

In the prime mover portion 2, also shown in FIG. 3 and FIG. 4, an engine 10 is mounted on the body frame 1, a radiator 11 is arranged at a position directly in front of the engine 10 by way of a support frame body 18, an air cleaner 12 is arranged at a position directly in front of the radiator 11, a precleaner 13 is arranged at a position directly above the air cleaner 12, a battery 14 is arranged at a position directly below the air cleaner 12, and a fuel tank 15 which is formed in the longitudinally extending manner is arranged at a position directly above the engine 10. These portions are covered with a bonnet 16 in an open-and-close manner. Numeral 17 indicates a muffler.

In the air cleaner 12, on an intermediate support frame forming member 18a which is formed on a middle portion of the support frame body 18 in the vertically extending manner, a middle portion of a rear peripheral surface of an air cleaner body 19 which is formed in the laterally extending manner is mounted by way of a bracket 20. An intake airport portion 21 formed in a left end portion of the air cleaner 12 and a suction port portion 32 (see FIG. 2) formed on a left upper portion of the engine 10 are communicably connected with each other by way of an intake air pipe 23.

Further, a communication pipe 24 is raised upwardly from a right upper portion of the air cleaner 12, and the precleaner 13 is communicably connected to an upper end portion of the communication pipe 24.

Figure 3:
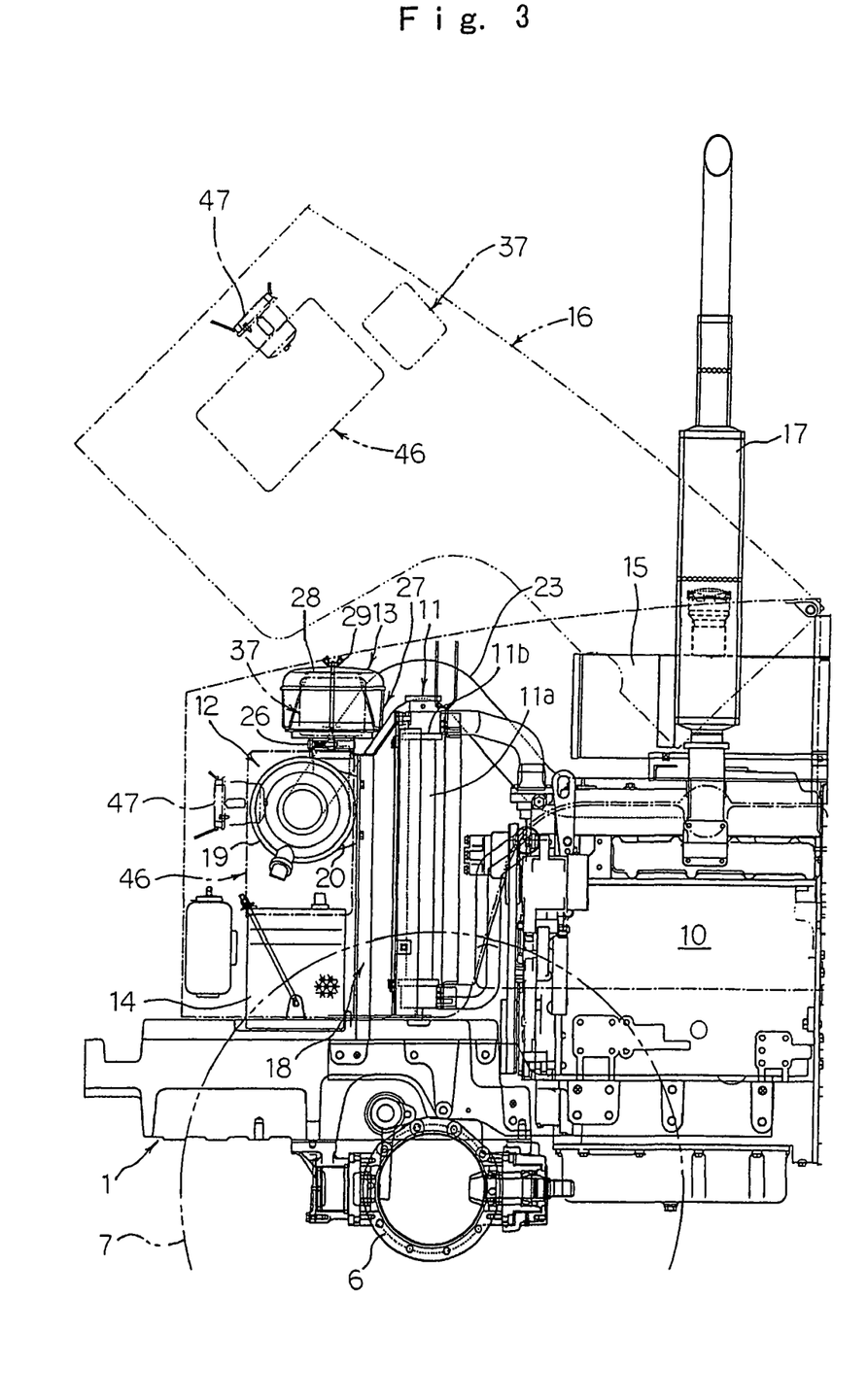
FIG. 3 is an explanatory side view of a prime mover portion.
Figure 4:
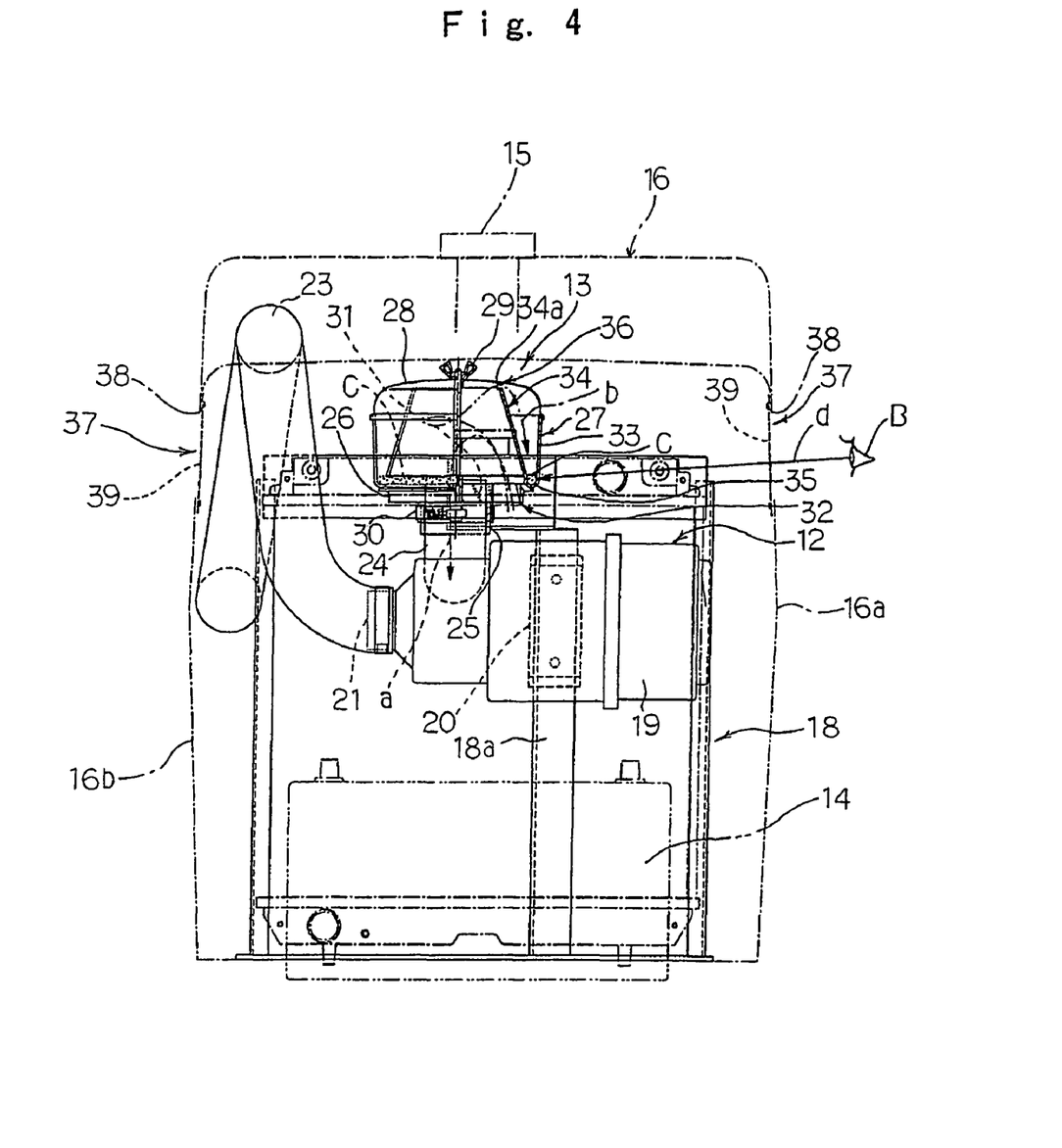
FIG. 4 is an explanatory front view of the prime mover portion.

That is, the precleaner 13 is, as shown in FIG. 3 and FIG. 4, constituted of a cylindrically formed fitting mounting member 25 which has an axis thereof directed vertically to be fitted on an upper outer peripheral surface of the communication pipe 24, a ring-shaped intake air port forming member 26 which is arranged outside the fitting mounting member 25, a cylindrical precleaner body 27 which is mounted on the intake air port forming member 26 in a state that the precleaner body 27 is communicated with an upper end peripheral portion of the intake air port forming member 26, and a lid body 28 which closes an upper surface of the precleaner body 27 in an open-and-close manner. Numeral 29 indicates a lid body fixing member and numeral 30 indicates a fitting-mounting-member fastening fixing member.

Further, a large number of vortex forming fins 31 are formed on an inner peripheral surface of the intake air port forming member 26 at fixed intervals in the circumferential direction, and an intake air port 32 is formed between a lower end peripheral portion of the intake air port forming member 26 and an outer peripheral surface of the fitting mounting member 25. Due to such a constitution, air sucked from below through the intake air port 32 is guided by the vortex forming fins 31 to generate a vortex in the inside of the precleaner body 27.

Further, the precleaner body 27 is constituted of a transparent or semi-transparent cylindrically formed outer wall forming member 33, and an inner wall forming member 34 which is formed in a cylindrical shape which has a distal end thereof tapered inwardly and upwardly from a lower end peripheral portion of the outer wall forming member 33. On a connecting portion of the inner wall forming member 34 and the outer wall forming member 33, a dust collecting/storing portion 35 which is a group portion having a side cross section which is recessed downwardly in a semi circular shape and having a ring shape in a plan view is formed.

Here, an upper end peripheral portion 34a of the inner wall forming member 34 extends to a position in the vicinity of an inner surface of the lid body 28, a communication passage 36 is formed between the upper end peripheral portion 34a and the inner surface of the lid body 28, and inner side of the inner wall forming member 34 and the dust collecting/storing portion 35 are communicated with each other through the communication passage 36.

Due to such a constitution, air which is the outside air is sucked from the intake air port 32, generates the vortex in the inside of the inner wall forming member 34, and is sucked into the air cleaner 12 through the communication pipe 24. On the other hand, the dust or the like which are scattered upwardly is stored in the collecting/storing portion 35 though the communication passage 36. As a result, the outside air is purified by the precleaner 13. Symbol "a" indicates the moving direction of air, symbol "b" indicates the moving direction of dust or the like, and symbol "c" indicates stored dust or the like.

The outside air purified by the precleaner 13 is further purified by the air cleaner 12. Thereafter, the outside air is sucked into the engine 10 through the intake air port portion 21 of the air cleaner 12, the intake air pipe 23, and the suction port opening of the engine 10.

Here, the gist of the present invention lies in that the precleaner 13 is configured such that at least the inside of the dust collecting/storing portion 35 is viewable from the outside in a see-through manner and, at the same time, viewing portions 37, 37 are formed in the bonnet 16 thus making the inside of the dust collecting/storing portion 35 viewable through the respective viewing portions 37, 37.

That is, the precleaner 13 is configured such that the outer wall forming member 33 of the precleaner body 27 is made of the transparent or semi-transparent material as mentioned above thus making the inside of the dust collecting/storing portion 35 viewable from the outside in a see-through manner.

Then, viewing windows 38, 38 are respectively formed in front portions of left and right side walls 16a, 16b of the bonnet 16, and a see-through body 39 is extended over each viewing window 38 thus making the inside of the bonnet 16 and the inside of the dust collecting/storing portion 35 of the precleaner 13 viewable from the outside of the bonnet 16 through the respective see-through bodies 39. In FIG. 1 and FIG. 3, numeral 46 indicates a side outside door intake portion, and numeral 47 indicates a head lamp.

Further, the respective viewing portions 37, 37 are respectively arranged at positions on the left and right side walls 16a, 16b of the bonnet 16 which allows viewing from the direction d substantially horizontal with respect to the dust collecting/storing portion 35.

Here, the position at which the viewing portion 37 is arranged may be any position provided that such a position is a position of the bonnet 16 which allows viewing from the direction substantially horizontal with respect to the dust collecting/storing portion 35. For example, the position at which the viewing portion 37 is arranged may be a front wall or a front portion of a ceiling wall of the bonnet 16. Although the viewing portions 37, 37 are respectively formed in the left and right side walls 16a, 16b of the bonnet 16 in this embodiment, the viewing portion 37 may be arranged only on either one of side walls.

Further, as the above-mentioned see-through body 39, a mesh-like net body, a punching metal or a transparent acrylic plate may be used. Further, as the above-mentioned see-through body 39, an open-and-close lid body which closes the viewing window 38 in an open-and-close manner may be used.

In this manner, at least the inside of the dust collecting/storing portion 35 of the precleaner 13 is viewable through the viewing portion 37 formed in the left wall portion 16a of the bonnet 16 and hence, time and efforts for opening the bonnet 16 every time becomes no more necessary. Further, an operator can surely view a storing state of dust or the like in the inside of dust collecting/storing portion 35 by merely viewing the inside of the dust collecting/storing portion 35 through the viewing portion 37 and hence, the operator can easily confirm the necessity of the maintenance of the precleaner 13.

Here, the viewing portion 37 is arranged at the position on the left side wall 16a of the bonnet 16 which allows viewing form the direction d substantially horizontal with respect to the dust collecting/storing portion 35 through the viewing portion 37 and hence, the operator can surely view the storing state of dust or the like in the inside of the dust collecting/storing portion 35 through the viewing portion 37 in a relaxed posture. As a result, an operator can efficiently and properly perform a maintenance operation of the precleaner 13.

Further, in this embodiment, as shown in FIG. 3 and FIG. 4, the precleaner body 27 is arranged at a position in front of the radiator 11 and, at the same time, is arranged at a position above an upper end peripheral portion 11b of a radiator core portion 11a which forms a hear generating portion of the radiator 11.

In this manner, the precleaner body 27 which is arranged at the position in front of the radiator 11 is arranged at the position above the upper end peripheral portion 11b of the radiator core portion 11a and hence, it is possible to prevent the precleaner body 27 from becoming an obstacle against a cooling wind which flows from a front side of the precleaner body 27 toward the radiator core portion 11a behind the precleaner body 27 thus ensuring the smooth heat radiation of the radiator 11. As a result, it is possible to ensure a favorable cooling function of the engine 10 by the radiator 11.

Further, the precleaner body 27 is arranged at the upper position and hence, an operator can perform the viewing operation of the dust collecting/storing portion 35 through the viewing portion 37 formed in the bonnet 16 in a relaxed posture. As a result, the operator can surely perform the viewing operation and hence, the operator can efficiently and properly perform the maintenance operation of the precleaner body 27 and, at the same time, a fatigue which the operator feels in the viewing operation can be reduced.

Further, at the position in front of the radiator 11, the precleaner 13, the air cleaner 12 and the battery 14 are arranged from above to below in this order and, at the same time, the precleaner 13, the air cleaner 12 and the battery 14 are arranged such that at least portions of these parts overlap each other in the vertical direction.

Due to such a constitution, the precleaner 13, the air cleaner 12 and the battery 14 can be arranged in a compact manner at the position in front of the radiator 11. As a result, it is possible to shorten a longitudinal width of the body of the tractor.

In the driver's portion 5, as shown in FIG. 1 and FIG. 2, a dash board 40 is mounted in an erected manner to close a rear-end opening portion of the bonnet 16 formed on the prime mover portion 2, a meter panel 41 is mounted on an upper end portion of the dash board 40, a steering wheel support shaft 42 is made to project upwardly from the meter panel 41, a steering wheel 43 is mounted on an upper end portion of the steering wheel support shaft 42, and a driver's seat 44 is arranged at a position behind the steering wheel 43 and at a position directly above the transmission portion 4.

Further, as shown in FIG. 1 and FIG. 2, a cover body 45 is extended over the driver's portion 5, the transmission portion 4 and the left and right rear wheels 9, 9, and a step portion of the driver's portion 5 is formed of the cover body 45. Here, the cover body 45 covers an upper portion of the transmission portion and a front portions and upper portions of the left and right rear wheels 9, 9.

Figure 5:
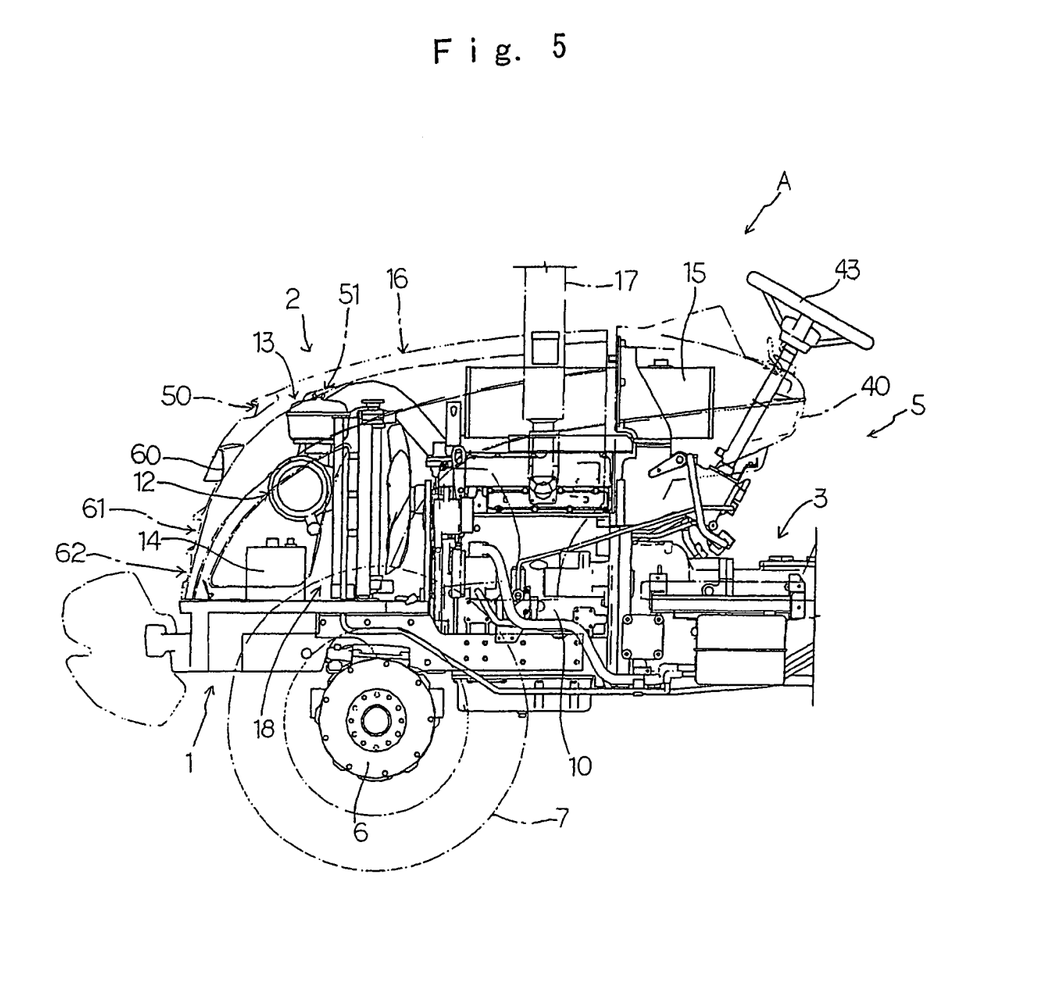
FIG. 5 is an explanatory side view of a front portion of a tractor of another embodiment.
Figure 6:
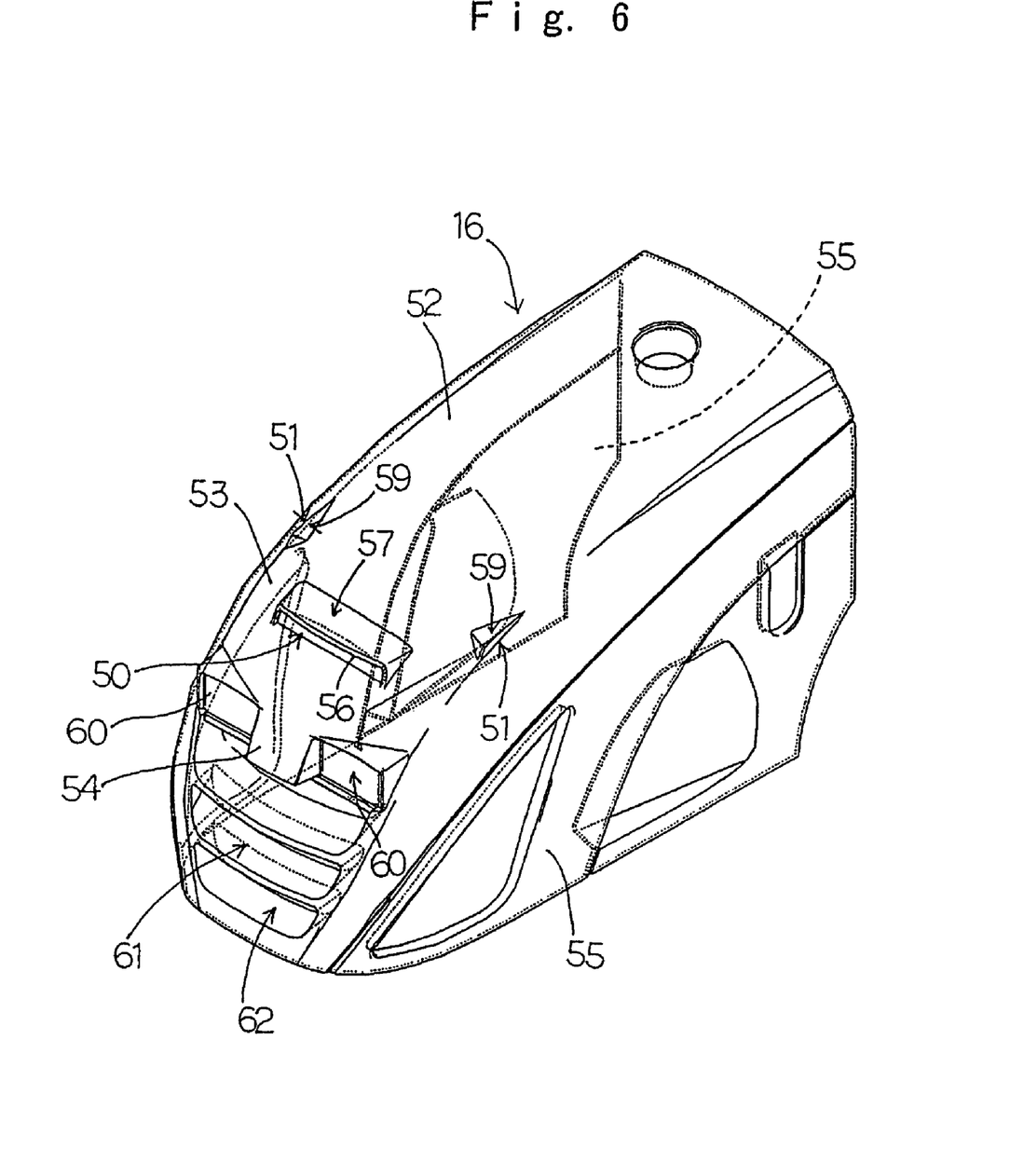
FIG. 6 is a perspective view of a bonnet.
Figure 7:
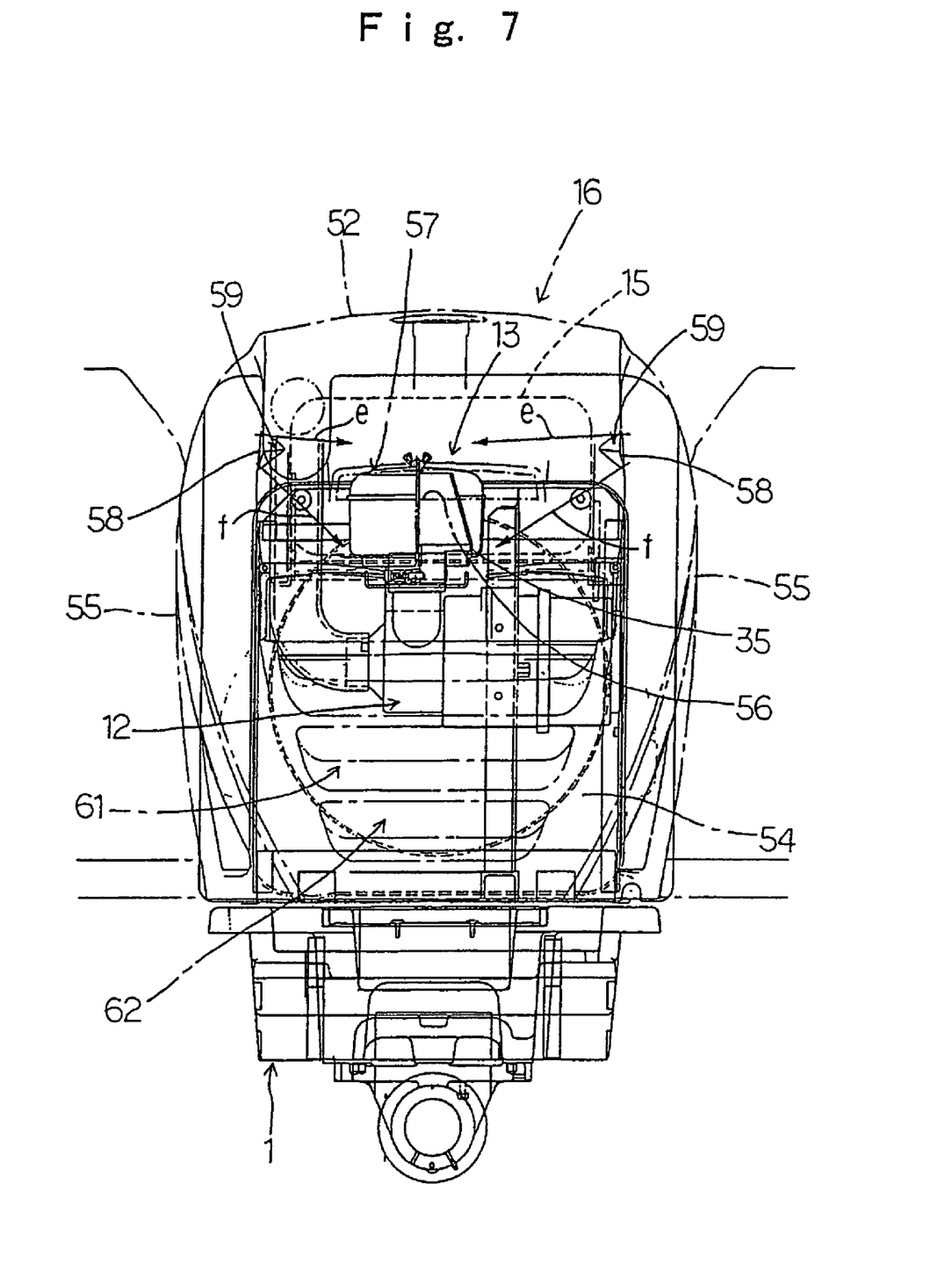
FIG. 7 is an explanatory front view of the inside of the bonnet.

FIG. 5 to FIG. 7 shows a tractor A of another embodiment. Although the tractor A has the same basic structure as the above-mentioned tractor A, the tractor A differs from the above-mentioned tractor A in the structure of the bonnet 16.

That is, as shown in FIG. 5 to FIG. 7, in portions of the bonnet 16 positioned in the vicinity of the dust collecting/storing portion 35 of the precleaner 13, a viewing portion 50 and lighting window portions 51, 51 are formed.

Here, the bonnet 16 is, as shown in FIG. 6, constituted of a ceiling portion 52 which is formed in a slightly downwardly inclined curved manner in the front downward direction, a front upper portion 53 which is formed by bending in a quarter arcuate shape from a front end peripheral portion of the ceiling portion 52, a front wall portion 54 which is formed in a downwardly extending manner from a lower end peripheral portion of the front upper portion 53, and left and right side wall portions 55, 55 which are curved smoothly to be contiguously formed with left and right peripheral portions of the front wall portion 54 and the left and right peripheral portions of the ceiling portion 52.

Further, as shown in FIG. 5 to FIG. 7, the above-mentioned viewing portion 50 is formed in the front upper portion 53, the viewing portion 50 is formed by opening a viewing window 56 having a narrow width which extends in the lateral direction in the upper front portion 53, a viewing window cover body 57 is extended in a frontwardly projecting manner along an upper peripheral portion and left and right peripheral portions of the viewing window 56, and an upper portion and left and right side portions of the viewing window 56 is covered with the viewing window covering body 57. Although not shown in the drawing, a dust proof member such a punching metal is extended over the viewing window 56.

Due to such a constitution, an operator can view the inside of the bonnet 16 through the viewing window 56 from a front side of the body.

Further, as shown in FIG. 5 to FIG. 7, the above-mentioned lighting window portions 51, 51 are formed in the left and right side portions of the front end of the ceiling portion 52. The lighting window portions 51 are formed by opening lighting windows 58, 58 having an elongated triangular shape with a width gradually increased frontwardly, lighting window cover bodies 59, 59 are extended outwardly in a projecting manner along front peripheral portions and upper peripheral portions of the respective lighting windows 58, 58 thus covering front and upper portions of the lighting windows 58, 58 with the respective lighting window cover bodies 59, 59. Symbols e, f indicate the directions of the entering lights which intrude into the inside of the bonnet 16 through the lighting windows 58, 58. Although not shown in the drawing a dust preventing member such as a punching metal is extended over the respective lighting windows 58, 58.

Due to such a constitution, it is possible to bring the light in the inside of the bonnet 16 through the respective lighting windows 58, 58 from the positions at left and right sides of the front portion of the bonnet 16.

According to this embodiment, the viewing portion 50 and the lighting window portions 51, 51 are formed in the portions of the bonnet 16 positioned in the vicinity of the dust collecting/storing portion 35 of the precleaner 13 and hence, the surrounding of the dust collecting/storing portion 35 can be surely brightened with a light brought into the bonnet 16 through the lighting windows 58 of the respective lighting window portions 51 and, at the same time, the operator can surely and easily view the brightly illuminated dust collecting/storing portion 35 through the viewing window 56 of the viewing portion 50 formed in the vicinity of the dust collecting/storing portion 35.

Accordingly, the visibility of the storing state of the dust or the like in the inside of the dust collecting/storing portion 35 through the viewing window 56 can be enhanced.

As a result, the operator can surely view the storing state of the dust or the like in the inside of the dust collecting/storing portion 35 through the viewing window 56 in a relaxed posture and hence, the maintenance operation of the precleaner 13 can be performed efficiently and properly.

Further, as shown in FIG. 5 to FIG. 7, a pair of head lights 60, 60 is mounted on an upper portion of the front wall portion 54, and an upper intake air port portion 61 and a lower intake air port portion 62 are arranged at a position below these head lights 60, 60 in two stages in the vertical direction.

INDUSTRIAL APPLICABILITY

The structure of the tractor according to the present invention is useful in the structure which supplies the outside air purified by the precleaner to the engine after further purifying through the air cleaner.

The invention claimed is:

1. A tractor in which outside air that is purified through a precleaner is further purified through an air cleaner before the outside air is supplied to an engine, comprising
    a radiator arranged in front of an engine, a precleaner arranged in front of the radiator, the engine, the radiator and the precleaner being covered with a bonnet movable between an open state and a closed state,
    the precleaner being arranged so that an interior of at least a dust collecting/storing portion of the precleaner is viewable from a location that is outside the bonnet, and
    the bonnet including a viewing portion which is configured to allow visual observation of the interior of the dust collecting/storing portion from outside the bonnet through the viewing portion of the bonnet when the bonnet is in a closed state.

2. A tractor according to claim 1, wherein the viewing portion is located on the bonnet at a position providing a substantially horizontal view of the dust collecting/storing portion.

3. A tractor according to claim 1, wherein the precleaner is arranged in front of the radiator, and is further arranged at a position above a radiator core portion which forms a heat generating portion of the radiator.

4. A tractor according to claim 3, wherein the precleaner, the air cleaner and a battery are arranged from above to below, in order, at a position in front of the radiator, and the precleaner, the air cleaner and a battery are arranged such that at least portions thereof overlap each other.

5. A tractor according to claim 1, wherein a lighting window portion is formed in the bonnet.

6. A tractor according to claim 5, wherein the viewing portion and the lighting window portion are each formed at a position in the bonnet located in the vicinity of the dust collecting/storing portion of the precleaner.

\* \* \* \* \*